Aug. 4, 1931. J. H. HUNT 1,817,194

SECURING DEVICE FOR HUB CAPS

Filed April 7, 1928

INVENTOR.
J. HAROLD HUNT
BY John P. Tarbox
ATTORNEY.

Patented Aug. 4, 1931

1,817,194

UNITED STATES PATENT OFFICE

J. HAROLD HUNT, OF DETROIT, MICHIGAN, ASSIGNOR TO BUDD WHEEL COMPANY, OF PHILADELPHIA, PENNSYLVANIA, A CORPORATION OF PENNSYLVANIA

SECURING DEVICE FOR HUB CAPS

Application filed April 7, 1928. Serial No. 268,345.

My invention relates to a securing device for hub caps such, for example, as are used to close the open outer ends of hub bodies of vehicle wheels and to provide a finished appearance for the outer end of the hub body.

It is an object of my invention to provide a device of this kind which is very simple of construction and permits the assembly and disassembly of the hub closure cap by simply relatively moving the closure cap axially of the hub body and which automatically and securely locks the cap in place after such relative axial movement to bring them into assembled relation.

I attain these objects by providing a cap with a portion which telescopes the end of the hub body until a stop shoulder prevents further telescopic movement, one of said parts either the cap or the hub shell, being provided with a portion having yielding projections, such as a spring ring held thereon by its resiliency and having such projections formed thereon, which projections pass automatically behind a corresponding shoulder or shoulders on the other of said parts when the two parts are assembled by axial telescoping movement to lock the parts against separation.

The ring and the shoulder behind which it locks where a separate ring is used to form the locking projections are further preferably so shaped with chamfered or inclined interengaging surfaces that the cap will be tightly drawn against the limiting shoulder and held securely against all ordinary shocks or jars tending to dislodge it, but permitting the cap to be dislodged by the application of a force sufficient to cause the ring, because of said inclined interengagement with the shoulder behind which it locks to yield and allow the removal of the cap from the hub body.

In the accompanying drawings, I have illustrated one embodiment of the invention showing the application thereof to the hub shell and cap therefor of a wire wheel. In these drawings.

Figure 1:
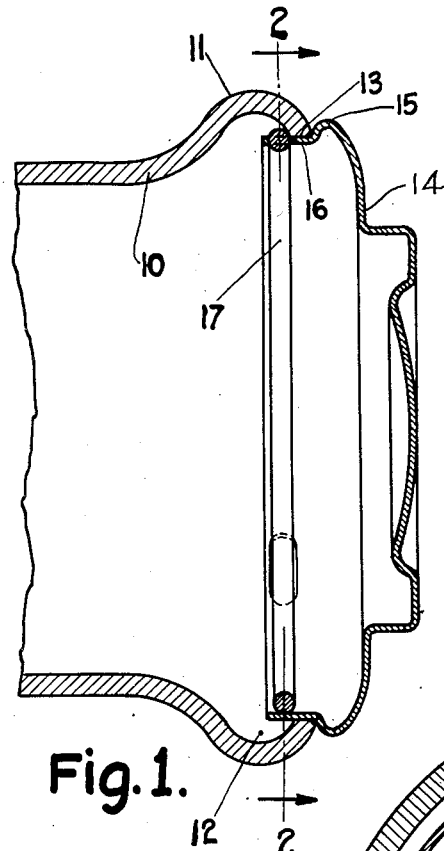
Fig. 1 is a sectional view through the axis of the hub shell taken on the line 1—1 of Fig. 2, showing the outer end thereof with the parts assembled.

The hub shell 10 to which I have shown my invention applied has its outer end formed into an outwardly projecting bead 11 providing a similar annular recess 12 on its inner side, the edge of the shell forming an annular seat 13 extending axially of the hub. Within this axially extending seat the hub cap 14, made of relatively light gauge metal is adapted to telescope, it being formed, in the present instance, with a beaded portion 15 extending outwardly beyond the annular inner axially extending portion 16 which fits telescopically within the annular seat 13 of the hub shell. This beaded portion 15 provides a limit shoulder 17' which limits the inward movement of the cap 14.

In the present embodiment of my invention, the locking means for securing the cap in place comprises a resilient ring 17, which may be made, as shown, of round stock and is provided with spaced struck out locking projections 18, in this instance three in number, spaced from each other approximately 120°. It is not necessary that the ring extend all the way around the periphery of the hub cap, and in this embodiment of my invention, I have shown it extending approximately two thirds of the distance around the cap, one of the locking projections 18 being arranged adjacent each end and the third at an intermediate location.

The ring 17 is normally biased to expand to a diameter substantially equal to or greater than the diameter of the inside of the annular inner portion 16 of the cap. The annular portion 16 of the cap is provided with spaced recesses or slots 19 corresponding in number and location to the projections 18 on the locking ring 17. The locking ring is assembled with the hub cap prior to its application to the hub by compressing it against its bias and then telescoping it inside the annular portion 16 of the cap and bringing the projections 18 into registry with their corresponding slots 19, when the ring will expand forcing the locking projections through the slots and thus secure the ring to the cap.

Figure 3:
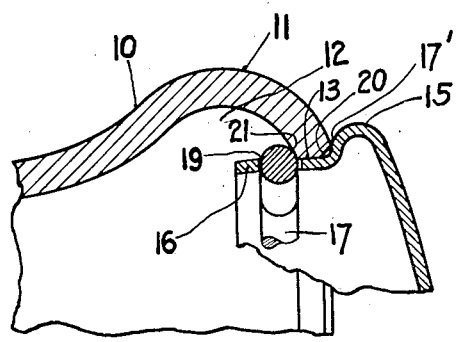
Fig. 3 is an enlarged detail sectional view on an enlarged scale, of one of the interlocking connections shown in Fig. 1.
Figure 2:
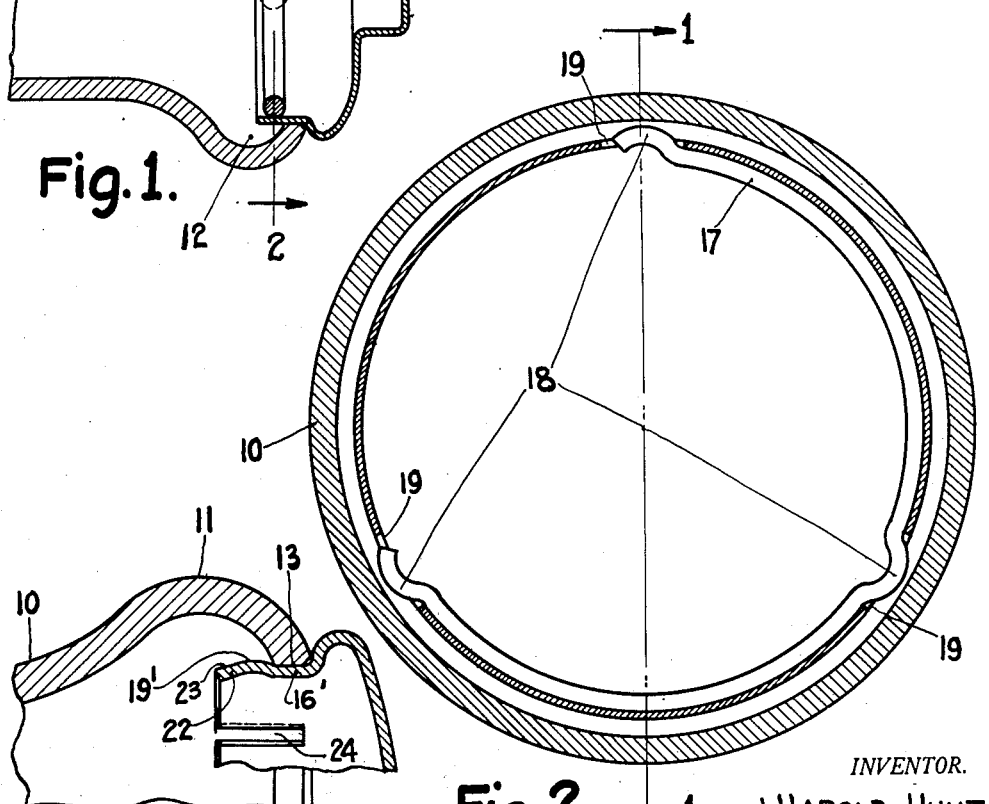
Fig. 2 is sectional view taken approximately on the line 2—2 of Fig. 1 looking in the direction of the arrows.
Figure 4:
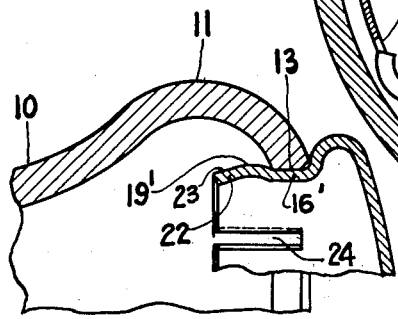
Fig. 4 shows a detail sectional view of modification of my locking device.

To apply this sub-assembly of hub cap 14 and locking ring 17 to the hub shell 10, the inner annular portion 16 of the cap is merely telescoped within the annular seat. When the projections 18 of the ring engage the outer edge of the hub shell they are readily depressed by engagement with the beveled surface 20 provided at this point, during the further telescoping movement, and when the hub cap is pressed home with its limit shoulder 17' in engagement with the outer edge of the hub shell, the locking ring and its projections will be in a position inwardly of the annular axial seat 13 of the hub shell and will be free to spring outwardly to the position shown in Figs. 1, 2 and 3 where the projections 18 engage behind the inclined inner surface 21 on the hub cap to lock the cap in place. It will be noted that the engagement between ring projections 18 and the surface 21 is along axially and outwardly inclined surfaces, so that the outward expansion of the ring to locking position because of said inclined camming engagement holds the hub cap firmly with its shoulder 17' pressed against the edge of the hub shell. Furthermore, while this inclined engagement is sufficient to lock the cap against ordinary shocks and jars, it does not preclude the ready removal of the cap, when required, by outwardly axially directed pressure on the cap, which, through the camming action of the inside locking surface 21 forces the projections radially inwardly, thereby releasing the cap.

Fig. 5 shows a simplified arrangement of my improved locking device in which the locking projections 19' are struck outwardly out of the metal of the cap, and the inner edge of the metal of the cap is turned inwardly as indicated at 22 to form a chamfered surface 23 which is readily entered axially into the outer end of the hub shell. To permit the depression of the projections by the axial telescoping movement of the cap into the hub shell, the annular telescoping portion 16' is slotted at spaced intervals, as indicated at 24, and when the projections have passed beyond the axial seat 13 on the hub shell they are forced outwardly by the resiliency of the metal to lock the cap in place.

While I have herein shown and described two specific embodiments of my invention it will be understood my invention may be embodied in numerous other forms, and that changes may be made in the relative arrangement of parts and in their coaction with each other, as long as they do not involve a departure from the generic spirit of the invention as embraced by the spirit and scope of the appended claim:

What I claim is:

In a wheel, the combination with a hub member having an annularly uniform overhanging flange, of a hub cap having a perimetral flange, a spring locking ring confined within said hub cap flange and having portions projecting through apertures in said hub cap flange and adapted to lock behind said overhanging flange, the portions of said spring ring which extend beyond said hub cap flange forming an acute angle with respect to the hub flange portions with which they are adapted to engage, whereby said cap may be attached to or detached from said hub flange by a pure axial movement in any relative rotary position of the parts.

In testimony whereof he hereunto affixes his signature.

J. HAROLD HUNT.